United States Patent Office 3,352,806
Patented Nov. 14, 1967

3,352,806
PROCESS FOR PREPARING AQUEOUS CARBOXY CONTAINING COPOLYMER SOLUTIONS
Darrell D. Hicks, Louisville, Ky., assignor to Celanese Coatings Company, a corporation of Delaware
No Drawing. Filed Dec. 29, 1964, Ser. No. 421,999
15 Claims. (Cl. 260—29.4)

This invention relates to polymeric materials and to aqueous polymeric coating compositions. More particularly, the invention pertains to high solids content coating compositions that are dilutable in water and to processes for preparing such compositions.

Water soluble polymeric compositions which are suitable for coatings applications are not readily prepared in water because of the water insolubility of the monomer components. The polymers are usually prepared in an organic solvent, the solvent is removed and the polymer is dissolved in an aqueous medium. Disadvantages of this kind of process are the distillation step required to remove the solvent and the difficulty in handling the polymer when free of solvent. The present invention involves the preparation of carboxy containing copolymers in a water soluble non-volatile solvent for the monomers and the copolymer which is non-reactive at the polymerization temperature used and subsequent treatment of the copolymer to render it water soluble. The water soluble carboxy containing copolymer can then be cured by a suitable water soluble aminoplast resin.

According to the present invention, a copolymer of an monoethylenically unsaturated monomer and an monoethylenically unsaturated carboxylic acid is prepared in a water soluble, non-volatile polyol and then without removal of the polyol, the copolymer is dissolved in water containing ammonia or an amine. The resulting aqueous solution is blended with a water soluble aminoplast resin and films prepared from the blend are cured with heat. The active groups of the copolymer and the hydroxyl groups of the polyol interact with the aminoplast resin in the curing reaction producing a cross-linked film. The water is evaporated either prior to or during the curing operation.

The water soluble non-volatile polyols serve a dual purpose in this invention. They act as solvents for the initial polymerization step and become part of the coating composition in the curing step. Organic solvent is not lost by evaporation from the coating but is utilized in the coating itself.

Vinyl polymer and copolymer solutions that can be used as protective coatings are usually applied as dilute solutions. High dilution is necessary in order that the solutions have a viscosity low enough for use. The film solids in these dilute solutions are thus necessarily low. Several coats must be applied in order to obtain desired film thicknesses. The polyoxy-alkylene polyols that are used as solvents in this invention do not lower the film solids of the solution. These polyols become part of the film itself since they are of a polymeric nature, are substantially non-volatile and are reactive with cross-linking agents because of their hydroxyl functionality. Solution coating compositions can thus be made according to this invention having higher solids content than was heretofore obtainable.

Films applied from volatile solvents have a tendency, in many instances, to wrinkle and to be uneven. The utilization of this invention eliminates this application difficulty since films having outstanding leveling and flow out characterstics are obtained. The polyols of this invention serve as flow control agents producing films having very good appearances and utility.

The alcohols which can be used in this invention are dihydric or polyhydric alcohols containing two or more hydroxyl groups and include polyoxy-alkylene polyols such as polyalkylene ethers resulting from the polymerization of monoepoxides with water or an alkanol initiator. Such compounds for example are the polyethylene glycols, polypropylene glycols, polybutylene glycols, glycols resulting from the copolymerization of ethylene oxide and propylene oxide, triols resulting from the polymerization of monoepoxides using as initiators glycerine, trimethylol ethane, trimethylol propane, etc., and tetrols produced from monoepoxides and pentaerythritol initiator. These polyols should be susbstantially water soluble and should have boiling points higher than the temperatures used in curing the coatings, such temperatures being generally at least about 100° C.

Polyoxy-alkylene polyols are available in a wide variety of molecular weights, varying from dimers and trimers up to molecular weights in the thousands and hundreds of thousands. The preferred polyols for use in this invention are those having molecular weights of about 200 to about 2000. Lower molecular weight polyols, for example, diethylene glycol and dipropylene glycol, can be used but in some instances, these lower molecular weight polyols are poor solvents for the carboxylic acid copolymers. Polymers having molecular weights above 2000 can also be used provided they are substantially water soluble. However, when such polyols are utilized, the viscosity of the carboxylic acid copolymer-polyol solutions become somewhat high making their processing more difficult. Polyols having molecular weights of 200 to 2000 have been found to give the best combination of solvency power and viscosity.

The polyoxy-alkylene polyols are very efficient polymerization media, the conversion of monomers to polymers being attained in these media in from one-half to two-thirds the time as is required when the common organic solvents (aromatic hydrocarbons, ketones, etc.) are used.

The carboxylic acid copolymers are prepared by known addition polymerization methods from ethylenically unsaturated carboxylic acids, such as acrylic acid, methacrylic acid, crotonic acid, itaconic acid, and maleic and fumaric half esters of monohydric alcohols, together with other copolymerizable ethylenically unsaturated compounds containing a vinylidene group. The latter compounds include methyl acrylate, ethyl acrylate, butyl acrylate, 2-ethylhexyl acrylate, hydroxyethyl acrylate, hydroxypropyl acrylate, hydroxybutyl acrylate, ethyl alpha-(hydroxymethyl) acrylate, dihydroxypropyl fumarate, dihydroxybutyl fumarate, methyl methacrylate, propyl methacrylate, hydroxypropyl methacrylate, hydroxypropyl crotonate, hydroxybutyl methyl maleate, vinyl acetate, vinyl propionate, acrylonitrile, acrylamide, methacrylamide, styrene, vinyl toluene, alphamethyl styrene, and the like.

The catalysts used for promoting the polymerization of the vinylidene monomers are the known free radical producing catalysts. Such catalysts include hydrogen peroxide, benzoyl peroxide, dilauryl peroxide, ditertiary butyl peroxide, cumene hydroperoxide and azobis-isobutyronitrile.

In the polymerization of the vinyl monomers in the polyoxy-alkylene polyol, sufficient polyol is used to render the polymer-polyol fluid and stirrable, at the reaction temperature of the polymerization. This amount of polyol will vary somewhat depending upon the molecular weight and viscosity of the particular polyol being used, the solvent strength of the polyol for the polymer being formed, the particular monomers being polymerized and the molecular weight of the resulting copolymer. The minimum amount of polyol to be used under any particular set of conditions can be readily ascertained by anyone skilled in the art by routine experimentation.

Generally, the minimum amount of polyol has been found to be about 30 percent based upon the weight of the resulting polymer-polyol solution. More than this amount can be used, and generally it has been found that up to about 70 percent of polyol based upon the weight of polymer-polyol solution results in compositions which produce films of good overall properties on curing. When more than this amount of polyol is used, the resulting films after being cured are softer and weaker and have inferior resistance to water and solvents. The preferred amounts of polyoxy-alkylene polyol that will be used in conjunction with the carboxylic acid containing polymers is 40 percent to 60 percent based on the weight of the polymer-polyol solution.

In order to obtain a polymer system which can be dissolved in water containing an amine or ammonia, sufficient polymerizable carboxylic acid must be used in combination with the other polymerizable monomers to produce a copolymer having generally sufficient carboxylic acid groups to give an acid value of at least about 30. When the polymerizable acid is acrylic acid, the amount of acid will be about 4 percent based on the resulting polymer. The minimum acid value will be somewhat dependent upon the combination of monomers used to make up the polymer. When part of the polymer is comprised of monomers containing polar groups such as hydroxy-alkyl esters of polymerizable acids or an acrylamide an acid value of about 30 is sufficient to enable the polymer to be dissolved in ammonia or amine water. However, when such polar components are not present, a minimum acid value of about 50 is desirable to obtain water solubility. When 20 percent or more of styrene or vinyl toluene are present in the polymer, the acid value should be at least about 60.

The upper limit of acid value will depend upon the end use of the coating compositions. When the aqueous polymer-polyol composition is to be blended with an aminoplast resin and is to be used immediately, then the acid value can be as high as about 400. However, when the blend of polymer-polyol-aminoplast resin is to be stored for some time before use, the acid value should be limited to below about 120 in order to obtain stability of the blend.

It is apparent from the above discussion that the particular acid value of the copolymer necessary to impart water-solubility thereto by reacting the copolymer with amine or ammonia and water can be varied quite widely depending upon the particular monomers being copolymers. The exact acid value necessary for any particular copolymer can be determined by those skilled in the art by routine experimentation.

All of the monomers incorporated into the system and copolymerized to form the copolymers do not have to be soluble in the polyol in order to carry out the objects of this invention. Some monomers, such as styrene and acrylamide may not be soluble in the particular polyol used as the polymerization medium alone but when incorporated into the polyol in combination with various other monomers such as acrylic acid, and acrylic esters, the monomers can be dissolved in the system as a whole due to the presence of the other monomers. It is thus the solubility of the monomers in a particular system that controls rather than the solubility of an individual monomer in the polyol by itself. The term "polyhydric alcohol which is a solvent for the monomers" as used in the claims includes within its scope monomers or combinations which would be soluble individually in the polyol as well as combinations of monomers which would be soluble in the polyol in combination although one or more of the individual monomers making up such combination may be insoluble in the polyol if used alone.

In carrying out the polymerization of the vinyl monomers in the polyoxy-alkylene polyol, the monomers and polymerization catalyst can be dissolved in the polyol and polymerized by heat. However, it is preferred to slowly add the mixture of monomers and catalyst to the heated polyol, and carry out the polymerization with no build-up of monomers in the reaction vessel. Good control of the heat of reaction is thereby obtained.

Copolymer compositions that have been found to be particularly useful in this invention are carboxy-hydroxy copolymers prepared in the polyol media. These carboxy-hydroxy copolymers contain sufficient polymerized carboxylic acid to give an acid value advantageously of at least 30, and 5 percent to 75 percent based on the copolymer composition of a hydroxy-alkyl ester of a polymerized acid with or without additional polymerized vinylidene monomers. Carboxy-hydroxy copolymers can be prepared by copolymerizing a mono ethylenically unsaturated carboxylic acid and a hydroxyalkyl ester of a mono ethylenically unsaturated carboxylic acid with or without additional vinylidene monomer. Another method is to copolymerize a mono ethylenically unsaturated carboxylic acid with a vinylidene monomer and then to esterify the copolymer thus formed using a monoepoxide to form the carboxy-hydroxy copolymer. Still another method for preparing these hydroxy-carboxy copolymers is to copolymerize the alpha-beta unsaturated monomer and the vinylidene monomer in the polyol medium while concomitantly esterifying the carboxylic acid with a monoepoxide.

The copolymerization process which can be employed to form the carboxy-hydroxy copolymers can be the same process as is disclosed herein for the preparation of the carboxy containing copolymers as will be apparent to those skilled in the art.

Various hydroxyalkyl esters of mono ethylenically unsaturated carboxylic acids that can be used to form the carboxy-hydroxy copolymers are disclosed above.

When the carboxy-hydroxy copolymers are prepared by reacting carboxylic acid with a vinylidene monomer (a mono ethylenically unsaturated monomer copolymerizable with the unsaturated carboxylic acid) and with subsequent esterification with a monoepoxide the vinylidene monomer is generally free of hydroxyl groups so that the copolymer formed contains only carboxyl groups. Some of the carboxyl groups are then reacted with a monoepoxide to form the carboxy-hydroxide copolymers.

Examples of such hydroxy free vinylidene monomers that can be used include those hydroxy free monomers disclosed above.

Since the carboxy and the carboxy-hydroxy copolymers which are dissolved in a substantially reactive solvent and rendered water soluble therein are basically old and well known copolymers the list of monomers that can be used to form the copolymers is to be considered as representative of some monomers that can be used. Other monomers besides those given as specific examples can also be used as will be apparent to those skilled in the art. The solubility properties of the various monomers and copolymers required with respect to the present invention can be determined by routine experimentation.

Various monoepoxides can be used to esterify the carboxy-copolymers as will be apparent to those skilled in the art including ethylene oxide, propylene oxide, butylene oxide, ethylene carbonate, styrene oxide, butyl glycidyl ether and the like.

The amines suitable for solubilizing the polymer-polyol solution in water are the primary, secondary and tertiary amines including substituted amines such as di- and tri-ethanol amines. Tertiary amines are particularly suitable for this use. It is necessary that the amines be at least slightly water soluble. Amines that are as basic as ammonia and as water soluble as triethyl amine have been found to impart water solubility to the polymer-polyol solution.

The amount of amine that will be used in combination with the polymer-polyol solutions of this invention will be that amount sufficient to impart water solubility. Generally, this amount of amine would be that which is equivalent to the carboxylic acid groups of the polymer. However, in some instances, it will be desirable to use less or more than this amount. The preferred amount has been found to be from about 0.5 equivalent to 1.5 equivalents of amine for each carboxylic acid equivalent.

The polymer-polyol solutions before solubilization in ammonia or amine water are at times quite viscous. In order to facilitate the handling of these solutions, water can be added to the solutions in an amount sufficient to lower the viscosity but insufficient to cloud up the solutions. This amount of water will generally be up to about 30 weight percent based upon the weight of total solvent. Water can be added to the polymer-polyol solution after the polymerization is completed, it can be added to the polyol before the polymerization is begun, or it can be added during the polymerization reaction. The last method is preferred since this method enables the reaction viscosity to be controlled quite readily. Before utilization in coating applications, the polymer-polyol-water solutions are reduced to application viscosities with ammonia or amine water.

In the preparation of the film forming compositions of the invention, the aqueous solutions of carboxylic acid containing copolymer and polyol before use are blended with a water soluble aminoplast resin. Such aminoplast resins include the reaction products of an aldehyde with urea, thiourea, melamine, benzoguanamine, acetoguanamine, dicyandiamide, and the like. The aldehydes that can be used for reaction with the above named compounds are formaldehyde, acetaldehyde, and the formaldehyde compounds—paraformaldehyde and trioxane. The aminoplast resins are preferably etherified with a lower alcohol such as methyl, ethyl or isopropyl. The aminoplast resins are preferably blended with the copolymer-polyol solution in amounts ranging from 10 percent to 60 percent by weight based on the solids content of the blend.

Acid catalysts, such as paratoluene sulfonic acid, butyl acid phosphate, phosphoric acid and the like can be added to the blends of carboxy copolymer-polyol and aminoplast resin to increase the rate of the curing reaction, producing films that will cure at a lower temperature or in a shorter time. Up to about 2 percent by weight of such acid catalysts based upon the total solids of the blend have been found to be advantageous in some instances.

Coatings can be prepared from the compositions of this invention either pigmented or unpigmented and applied by conventional means such as brushing, spraying, dipping and roller-coating. The coatings are then cured by heating at 100° C. to 250° C. for a time sufficient to effect a cure, such times generally being from about 5 minutes up to about 90 minutes.

The following examples are illustrative of this invention. Parts as expressed in the examples are parts by weight.

Example 1

To a suitable reaction flask equipped with stirrer, thermometer, condenser and dropping funnel were added 100 parts of polypropylene glycol having an average molecular weight 400. To the dropping funnel were added 90 parts of ethyl acrylate, 50 parts butyl acrylate, 50 parts hydroxypropyl crotonate, 10 parts acrylic acid and 4 parts benzoyl peroxide to form a monomer-catalyst solution. Heat was applied to the flask and when the temperature reached 120° C., addition of the monomer-catalyst solution from the dropping funnel was begun. All the monomer-catalyst solution was gradually added to the polypropylene glycol in the flask over a period of 1 hour and 5 minutes while holding the temperature between 119° C. and 135° C. Heating was then continued for 3 hours and 7 minutes at 112–120° C. to complete the polymerization reaction. The reactants were cooled to 55° C. and 200 parts of water and 10 parts of methylethanol amine were added. The resulting clear solution had a Gardner-Holdt viscosity of X to Y and an acid value of 33.

A blend was prepared from 23.8 parts of the copolymer solution, 10 parts of methylated methylol melamine resin at 60 percent solids in water, and 6.2 parts of water. 3 mil thick films applied on a glass panel were well cured after 30 minutes at 150° C. The films had extremely good mar resistance, flexibility and adhesion.

Example 2

To a reaction flask equipped as described in Example 1, were added 100 parts of polyethylene glycol having an average molecular weight 600. To the dropping funnel attached to the flask were added 90 parts of ethyl acrylate, 50 parts of butyl acrylate, 50 parts of hydroxypropyl crotonate, 10 parts of acrylic acid, and 4 parts of benzoyl peroxide to form a monomer-catalyst solution. Heat was applied to the flask and when the temperature of the polyethylene glycol reached 120° C., addition of the monomer-catalyst solution was begun. All the monomer catalyst solution was gradually added to the polyethylene glycol in the flask over a period of 1 hour and 4 minutes while holding the temperature at 120° C. to 123° C. Additional heating was continued for 2 hours and 30 minutes at 120° C. The temperature was then raised to 150° C. in 18 minutes. The reactants were cooled to 30° C., and 200 parts of water and 15 parts of methylethanol amine were added. The resulting clear solution had a Gardner-Holdt viscosity of $Z_5$ to $Z_6$.

To 20.6 parts of the aqueous copolymer solution were added 13.3 parts of methylated methylol melamine at 60 percent solids in water, and 6.1 parts of water. 3 mil films on glass were well-cured after 30 minutes at 150° C. The films had outstanding mar resistance, good adhesion and hardness.

Example 3

Using the same procedure as described in the preceding examples, 90 parts of ethyl acrylate, 50 parts of hydroxyethyl methacrylate and 10 parts of acrylic acid were copolymerized in 100 parts of polyethylene glycol having an average molecular weight 400, using 4 parts of benzoyl peroxide catalyst. The resulting copolymer solution was dissolved in 300 parts of water with 15 parts of methylethanol amine. The resulting clear solution had a Gardner-Holdt viscosity higher than $Z_6$. A blend was prepared using 24.6 parts of the aqueous copolymer solution, 13.3 parts of methylated methylol melamine at 60 percent solids in water, and 2.1 parts of water. 3 mil films were prepared on glass and were heated 30 minutes at 150° C. The resulting well-cured films had excellent mar resistance, adhesion and hardness.

Example 4

Using the same procedure as described in the preceding examples, 102.6 parts of ethyl acrylate, 57.4 parts of butyl acrylate, 30.0 parts of hydroxypropyl crotonate and 10 parts of acrylic acid were polymerized in 50 parts of a propylene oxide adduct of trimethylol propane having an average molecular weight 418, using 4 parts of benzoyl peroxide catalyst.

This copolymer solution was then dissolved in 300 parts of water and 15 parts of diethylethanol amine. The resulting clear solution had a Gardner-Holdt viscosity of $Z_5$.

A blend was prepared using 27.1 parts of the aqueous solution and 13.3 parts of methylated methylol melamine at 60 percent solids in water. Three mil films were prepared on glass and were heated at 150° C. for 30 minutes. The resulting well-cured films had excellent mar resistance and hardness.

Example 5

As described in the preceding examples, a copolymer solution was prepared from 96.2 parts of ethyl acrylate, 6.4 parts methyl methacrylate, 57.4 parts butyl acrylate, 30.0 parts hydroxypropyl crotonate and 10 parts acrylic acid in 50 parts of a propylene oxide adduct of pentaerythritol having an average molecular weight of 600 using 4 parts benzoyl peroxide catalyst.

This copolymer solution was then dissolved in 300 parts of distilled water and 15 parts of diethylethanol amine. The resulting clear solution had a Gardner-Holdt viscosity of $Z_6$.

To 31.6 parts of the aqueous copolymer solution were added 10 parts of methylated methylol melamine at 60 percent solids in water. Three mil films were prepared on glass and were heated for 30 minutes at 150° C. The resulting films were well-cured and exhibited good adhesion and excellent mar resistance.

*Example 6*

Using the same procedure as described in the preceding examples, a copolymer was prepared from 102.6 parts of ethyl acrylate, 27.4 parts of butyl acrylate, 30.0 parts of methyl methacrylate, 30 parts of hydroxyethyl methacrylate and 10 parts of acrylic acid in 50 parts of a propylene oxide adduct of pentaerythritol having an average molecular weight of 600, using 4 parts of benzoyl peroxide catalyst. The copolymer was then dissolved in 300 parts of water and 15 parts of triethyl amine producing a clear viscous solution.

36.1 parts of the aqueous solution were blended with 4.0 parts of hexamethoxy methyl melamine and 9.9 parts of distilled water. Films prepared on glass were well-cured after heating for 30 minutes at 150° C.

*Example 7*

To a suitable reaction flask equipped with a stirrer, thermometer, condenser and dropping funnel were added 200 parts of a propylene oxide adduct of trimethylol propane having an average molecular weight of 418. To the dropping funnel were added 40 parts of ethyl acrylate, 40 parts of butyl acrylate, 60 parts of methyl methacrylate, 60 parts of acrylic acid and 4 parts of benzoyl peroxide to form a monomer-catalyst solution. Heat was applied to the flask and when the temperature of the polyol was 120° C., addition of the monomer-catalyst solution was begun. All the monomer-catalyst solution was gradually added over a period of 1 hour and 8 minutes while holding the temperature at about 120° C. Heating at 118° C. to 132° C. was continued for 4 hours and 30 minutes, to complete the polymerization reaction. The temperature was then lowered to 65° C. and 25 parts of concentrated ammonia water (29 percent $NH_3$) and 200 parts of water were added. The resulting clear solution had a pH of 6, a Gardner-Holdt viscosity of Y to Z and Gardner color of 2 to 3 at 63.4 percent nonvolatiles.

25 parts of the carboxy copolymer-polyol solution in ammonia water were blended with 4 parts of hexamethoxy methyl melamine with 1 part of distilled water. 2 mil films prepared on glass were heated at 180° C. for 30 minutes resulting in well-cured films having high gloss, excellent mar resistance and excellent adhesion.

Films were also prepared from a blend of 21.9 parts of the copolymer-polyol ammonia water solution, 6 parts of hexamethoxy methyl melamine and 2.1 parts of distilled water. After a 30-minute bake at 180° C., the films were well-cured, and had high gloss, excellent mar resistance and excellent adhesion.

*Example 8*

To a suitable reaction flask equipped with a thermometer, stirrer, condenser and dropping funnel were added 150 parts of a propylene oxide adduct of trimethylol propane having an average molecular weight of 418. To the dropping funnel were added 45 parts of hydroxyethyl acrylate, 15 parts of acrylic acid, 60 parts of methyl methacrylate, 180 parts of methyl acrylate and 6 parts of benzoyl peroxide. Heat was applied to the flask raising the temperature of the contents of the flask to 120° C. The monomers and catalyst were then gradually added over a period of 1 hour and 17 minutes while holding the temperature at about 120° C. After 13 minutes heating at about 120° C., 50 parts of water were added to the reactants over a period of 14 minutes to lower the viscosity. During this addition, the reaction temperature dropped to 101° C. The reactants were then heated at 101° C. for 2 hours and 17 minutes. 50 parts of water and 50 parts of the propylene oxide adduct of trimethylol propane described above were added to reduce the viscosity of the reactants.

After 3 hours and 20 minutes at about 101° C., the polymerization reaction was completed. 60 parts of the propylene oxide adduct solvent were then added to clear up the solution.

To 18.8 parts of the resulting copolymer solution were added 4 parts of hexamethoxy methyl melamine, 3 parts of 3 percent ammonia water and 4.2 parts of water. 2 mil films were drawn down on a glass panel and were heated at 180° C. for 30 minutes. After this heating period, the films were well-cured. They exhibited very good mar resistance, were tough and flexible and had good adhesion to the glass panels.

Para-toluene sulfonic acid catalyst (0.2 weight percent based on film solids) was added to the above blend. The cured films prepared from this blend using the catalyst were harder and tougher than those prepared from the blend without the added catalyst.

*Example 9*

To a suitable reaction flask equipped with a thermometer, stirrer, condenser and dropping funnel were added 150 parts of a propylene oxide adduct of trimethylol propane having an average molecular weight of 418. To the dropping funnel were added 60 parts of methyl methacrylate, 180 parts of methyl acrylate, 60 parts of acrylic acid and 6 parts of benzoyl peroxide to form a monomer-catalyst solution. Heat was applied to the flask to bring the temperature of the contents to 120° C. and addition of the monomer-catalyst solution was begun. All the monomer-catalyst solution was gradually added in 1 hour and 20 minutes while holding the temperature at about 120° C. 50 parts of water were added to the flask and the temperature dropped to 100–101° C. Heating was continued at this temperature for 2 hours. In order to reduce the viscosity of the reactants further, 50 additional parts of distilled water were added. Heating was continued at 99° C. to 101° C. for 4 hours to complete the polymerization. 100 parts of the propylene oxide adduct solvent was added resulting in a clear viscous but pourable solution.

To 16.6 parts of the resulting copolymer solution were added 6 parts of hexamethoxy methyl melamine, 4 parts of distilled water and 7 parts of a 3 percent ammonia water solution. To the resulting clear solution 0.2 weight percent, based on solution solids, of para-toluene sulfonic acid was added. 3 mil films were drawn down on glass and were baked at 150° C. for 30 minutes. The resulting well-cured films were clear, colorless and glossy, had excellent mar resistance and excellent adhesion to the glass.

The carboxy copolymer produced in accordance with Example 9 can be converted to a carboxy-hydroxy copolymer by adding about 2 parts of an esterification catalyst such as benzoyl trimethyl ammonium chloride and between about 35 to 40 parts of propylene oxide to the carboxy copolymer solution and maintaining to temperature at about 120° C. for an additional hour. It is advisable to add the propylene oxide to the copolymer-catalyst solution slowly over the hour period.

Carboxy-hydroxy copolymer solutions can also be prepared concomitantly by admixing the propylene oxide adduct of trimethylol propane, the methyl methacrylate, methyl acrylate, acrylic acid and benzoyl peroxide together with about 2 parts of esterification catalyst such as benzoyl trimethyl ammonium chloride and about 35–40 parts of propylene oxide and maintaining to temperature of the mixture at about 80° C. for 6 to 8 hours unitl the reaction is complete.

In carrying out the esterification of the carboxy copolymers either subsequent to their formation or concomitantly sufficient carboxyl groups should be retained in the copolymer to enable the copolymer to be rendered water soluble by the addition of amine water. Copolymers having an acid value of at least about 30 are generally acceptable. The various alternatives as to reactive components, temperature, time, catalysts can be determined by those skilled in the art.

I claim:

1. A process for preparing aqueous carboxy containing copolymer solutions which comprises forming a solution of a mono ethylenically unsaturated carboxylic acid monomer, a different mono ethylenically unsaturated monomer copolymerizable therewith and a water soluble non-volatile polyhydric alcohol which is a solvent for the monomers and the copolymer of said monomers, heating the solution to copolymerize the monomers and to form a carboxy containing copolymer at a temperature sufficiently low to prevent any significant reaction between the alcohol, the monomers and the carboxy containing copolymer reaction product and forming a carboxy containing copolymer dissolved in the alcohol, and adding to the copolymer-alcohol solution water, and at least one member of the group consisting of ammonia and an amine in sufficient amount to render the carboxy copolymer water soluble.

2. The process according to claim 1 in which an aminoplast is mixed with the water soluble carboxy copolymer and the mixture heated to cure the carboxy copolymer.

3. The process according to claim 1 in which the ratio of the monomers is adjusted to form a carboxy copolymer having an acid value of at least about 30.

4. The process according to claim 3 in which an aminoplast is mixed with the water soluble carboxy coploymer and the mixture heated to cure the carboxy copolymer.

5. The process according to claim 1 in which the alcohol solvent has a molecular weight between about 200 and 2000.

6. The process according to claim 5 in which the ratio of the monomers is adjusted to form a carboxy copolymer having an acid value of at least about 30.

7. The process according to claim 6 in which an aminoplast is mixed with the water soluble carboxy copolymer and the mixture heated to cure the carboxy copolymer.

8. The process of forming a water soluble carboxy containing copolymer which comprises adding water and at least one member of the group consisting of ammonia and an amine to a water soluble non-volatile polyhydric alcohol in which a carboxy containing copolymer was prepared by reacting a monoethylenically unsaturated carboxylic acid monomer and a different monethylenically unsaturated monomer copolymerizable therewith is dissolved therein and said polyhydric alcohol has not entered the copolymer reaction.

9. The process according to claim 8 in which an aminoplast resin is added to the copolymer solution and the solution heated to cure the carboxy copolymer.

10. A process for preparing aqueous carboxy-hydroxy containing copolymer solutions which comprises forming a solution of a monoethylenically unsaturated carboxylic acid monomer and a hydroxy alkyl ester of a polymerizable monoethylenically unsaturated carboxylic acid monomer and a water soluble non-volatile polyhydric alcohol which is a solvent for the monomers and the carboxy-hydroxy copolymer of said monomers, heating the solution to copolymerize the monomers and to form a carboxy-hydroxy containing copolymer at a temperature sufficiently low to prevent any significant reaction between the alcohol, the monomers and the carboxy-containing copolymer reaction product to form a carboxy-hydroxy containing copolymer dissolved in the alcohol and adding to the copolymer-alcohol solution, water, and at least one member of the group consisting of ammonia and an amine in sufficient amount to render the carboxy-hydroxy copolymer water soluble.

11. The process according to claim 10 in which the acid value of the carboxy-hydroxy copolymer is at least about 30.

12. The process according to claim 11 in which the hydroxy alkyl ester constitutes between about 5 and 75% by weight based on the weight of the copolymer.

13. A process for preparing aqueous carboxy-hydroxy containing copolymer solutions which comprises forming a solution of a monoethylenically unsaturated carboxylic acid monomer and a vinylidene monomer coploymerizable therewith and a water soluble non-volatile polyhydric alcohol which is a solvent for the monomers and the copolymer of said monomers, heating the solution to copolymerize the monomers and to form a carboxy containing copolymer at a temperature sufficiently low to prevent any significant reaction between the alcohol, the monomers and the carboxy containing copolymer reaction product to form a carboxy containing copolymer dissolved in the alcohol, adding a monoepoxide to the solution and esterifying the copolymer to form a carboxy-hydroxy copolymer having an acid value of at least about 30, adding to the copolymer-alcohols solution, water and at least one member of the group consisting of ammonia and an amine in sufficient amount to render the carboxy-hydroxy copolymer water soluble.

14. The process according to claim 13 in which the carboxylic acid and the copolymer are esterified with a monoepoxide concomitantly with the polymerization of the carboxylic acid and the vinylidene monomer to form the carboxy-hydroxy copolymer.

15. The process according to claim 10 in which an aminoplast resin is added to the solution, and the solution heated to cure the copolymer.

References Cited

UNITED STATES PATENTS

| | | | |
|---|---|---|---|
| 2,906,724 | 9/1959 | Daniel | 260—29.4 |
| 3,002,959 | 10/1961 | Hicks | 260—88.1 |
| 3,118,848 | 1/1964 | Lombardi et al. | 260—29.6 |
| 3,245,933 | 4/1966 | Muskat | 260—29.4 |
| 3,300,439 | 1/1967 | Chloupek et al. | 260—33.4 |

SAMUEL H. BLECH, *Primary Examiner.*

MURRAY TILLMAN, *Examiner.*

J. C. BLEUTGE, *Assistant Examiner.*